United States Patent [19]
Lin

[11] Patent Number: 5,475,605
[45] Date of Patent: Dec. 12, 1995

[54] TIMING ANALYSIS FOR LOGIC OPTIMIZATION USING TARGET LIBRARY DELAY VALUES

[75] Inventor: Lon-Phon Lin, Milpitas, Calif.

[73] Assignee: Cadence Design Systems, Inc., San Jose, Calif.

[21] Appl. No.: 249,868

[22] Filed: May 26, 1994

[51] Int. Cl.$^6$ ........................................ G06F 11/25
[52] U.S. Cl. ..................... 364/488; 364/489; 395/550
[58] Field of Search ............................ 364/488, 489, 364/490, 491, 578; 395/550

[56] References Cited

U.S. PATENT DOCUMENTS

| | | | |
|---|---|---|---|
| 5,168,455 | 12/1992 | Hooper | 364/490 |
| 5,210,700 | 5/1993 | Tom | 364/489 |
| 5,287,289 | 2/1994 | Kageyama et al. | 364/489 |
| 5,293,327 | 3/1994 | Ikeda et al. | 364/578 |
| 5,305,229 | 4/1994 | Dhar | 364/489 |
| 5,333,032 | 7/1994 | Matsumoto et al. | 364/489 |
| 5,353,433 | 10/1994 | Sherman | 395/550 |
| 5,359,535 | 10/1994 | Djaja et al. | 364/489 |
| 5,365,463 | 11/1994 | Donath et al. | 364/578 |
| 5,381,345 | 1/1995 | Takegami et al. | 364/491 |
| 5,384,720 | 1/1995 | Ku et al. | 364/578 |

OTHER PUBLICATIONS

Burnstein, M. and Youssef, M., "Timing Influenced Layout Design" IEEE, 22nd Design Automation Conference; Paper 9.2, 124–130, 1985.
Berman, C. L. et al., "Efficient Techniques for Timing Correction" IEEE, 415–419, 1990.
Singh, K. J. et al., "Timing Optimization of Combinational Logic" IEEE, 282–285, 1988.
Chen, K. C. and Muroga, Saburo, "Timing Optimization for Multi-Level Combinational Networks" IEEE, 27th ACM/IEEE Design Automation Conference, Paper 21.1, 339–344, 1990.
Teig, S. et al., "Timing-Driven Layout of Cell-Based ICs" VLSI Systems Design, 63–73, May 1986.
Dunlop, A. E et al., "Chip Layout Optimization Using Critical Path Weighting" IEEE, 21st Design Automation Conference, Paper 9.2 133–136, 1984.

*Primary Examiner*—Kevin J. Teska
*Assistant Examiner*—Russell W. Frejd
*Attorney, Agent, or Firm*—Fenwick & West

[57] ABSTRACT

A computer automated logic synthesis tool performs a timing analysis during the optimization of a hardware description file including general logic expressions of a prototype circuit by minimizing a delay value for a gate network comprised of logic cells provided in a target library. Minimization occurs by modeling a gate network for a logic expression that orders the input signals into the gate network according to their input delays, and the output delays from assigned logic cells. The output delay for the assigned logic cell is based on intrinsic delays of boolean nodes in the logic cells. The delay for the gate network includes an R-C delay value for gate fan-out, based on the average R-C delay values in the target library. The logic synthesis tool is able to select from among various alternate logically equivalent gate networks, the gate network that provides the minimized timing delay.

10 Claims, 7 Drawing Sheets

TIMING ANALYSIS FOR LOGIC OPTIMIZATION USING TARGET LIBRARY DELAY VALUES

BACKGROUND OF THE INVENTION

1. Field of the Invention

The invention relates to electronic design automation systems, and more particularly to computer-aided engineering tools for logic synthesis.

2. Description of the Background Art

One aspect of integrated circuit design that is critical for circuit performance is the timing of signals between circuit elements. As very large scale integrated circuit (VLSI) fabrication technology reaches submicron device dimensions and circuit speed falls into the sub-nanosecond range, interconnect delays become the dominant factor in determining circuit speed. Further, as integrated circuit designs increase in size, interconnect delays between circuit cells become larger and account for an increasing percentage of total circuit delay. Accurately modeling the delay characteristics of the circuit elements has thus become an increasingly important process during the development of electronic system prototypes.

Currently, the design of electronic circuits and systems employs computer-automated design systems for defining and verifying various prototype circuit configurations. Typically circuit definition is accomplished by graphically entering circuit schematics at an engineering workstation or by using a logic synthesis tool, which generates a high-level, hardware description file functionally describing the logic of the desired prototype circuit. As part of the circuit definition, a number of delay constraints that limit the interconnect delay between circuit elements are specified by the circuit designer. These delay constraints must be satisfied when the prototype circuit is fabricated.

Logic synthesis tools usually include optimization routines, which convert the high-level prototype definition into an intermediate form that is more appropriate for the functional implementation of the prototype in a particular circuit manufacturing technology. Optimization during logic synthesis typically includes two stages: (1) a technology-independent ("TI") stage, where general logic expressions synthesized from the hardware description file are minimized, and (2) a technology-dependent ("TD") stage, where the minimized logic expressions are mapped into target library cells for a specific fabrication technology.

During the TI stage there is much flexibility to restructure circuit logic to minimize the number of nodes and literals, thereby reducing the area of the circuit. During this stage the circuit can be most effectively restructured to meet the specified delay constraints critical for circuit performance. During the TD stage, the delay characteristics of the target library are available, but very little restructuring of the circuit is possible. Accordingly, to meet the timing requirements of the prototype design, it is preferable to restructure the circuit during the TI stage.

However, little accurate delay information is available at the TI stage for optimizing the prototype circuit design with respect to the specified delay constraints. Traditionally at the TI stage, the available delay information is limited to fixed intrinsic delays of boolean nodes, which is the delay during the operation of a logic cell to process its input signals, and fixed resistive-capacitive (R-C) delays (wire delays) for each fan-out from a node, which is the delay of driving the output signal from a node to the next node. Each fan-out is typically fixed at a constant value of 0.2 μsec of delay, so the total delay of a prototype circuit is simply the number of fan-outs times the R-C constant delay value added to a fixed intrinsic delay for each logic stage.

This static timing analysis does not realistically reflect the varying delay contributions that arise once the circuit is mapped during the technology dependent optimization stage. First, traditional static timing analysis does not account for the fact that different target component libraries, e.g. CMOS, NMOS, TTL, all have distinct intrinsic delays for the same logic cell, such as a NAND cell, and distinct R-C delays for fan-outs, or that these delays can differ from the fixed values traditionally employed during the TI stage. Further these different fabrication technologies influence the relative significance of intrinsic delay and the fan-out delay on circuit performance, and hence on the overall delay of the circuit. Thus, TI optimization using static delay models is limited to a generalized optimization that will not fully exploit the timing properties of the target library in order to satisfy the delay constraints of the prototype circuit.

Second, conventional delay models do not reflect the delay characteristics according to the complexity of the boolean nodes of the circuit. Typically static timing models count the number of logic stages, regardless of the number of input signals to each node, or the complexity of the circuit logic, and assign a fixed delay for each logic stage. This type of analysis does not accurately model the differences in timing between complex logic gate networks and simple ones where there are varying numbers of gates in each logic stage that contribute varying amounts of delay. For example, in a static timing analysis the simple gate network (ab+cd+ac) has the same number of logic stages (2) and hence the same delay as the more complex gate network (abcd+cdac+edgf+ahjk), and no account is made of the greater delay typically associated with the larger (4 variables vs. 2 variables) nodes. A static timing analysis that merely counts logic stages is also inaccurate since a gate network with many logic stage each having a small number of literals may be faster than a gate network with fewer logic stages each having a large number of literals.

Finally, conventional delay models do not account for variations in gate fan-in delay, which is the variable timing difference between the input signals into a given gate network. For example, a gate network can have four input signals $I_1$, $I_2$, $I_3$, and $I_4$ with delays of 2, 2, 7, and 7 respectively, relative to an arbitrary signal. Though input signals $I_3$ and $I_4$ arrive later than $I_1$ and $I_2$, and thus could be assigned to a later logic stage, optimization using a static timing analysis will not distinguish between the input signals, but treat them all as arriving into the gate network at the same time. Accordingly, it will fail to fully optimize the gate network, and may be unable to satisfy the delay constraints of the network.

It is therefore desirable to provide an improved technique for technology-independent optimization that incorporates a more accurate model of timing delay into the minimized logic expressions than the static timing models currently employed.

SUMMARY OF THE INVENTION

The invention resides in a computer-automated design tool for performing timing analysis during logic synthesis, wherein the total delay value of a logic expression for a prototype circuit is analyzed using pre-defined delay values from the target library that will be used to fabricate the circuit in a specific technology. The timing analysis determines a minimized total delay value for a selected group of logic cells that implement the logic expression of the circuit. The delay values of the logic cells include the intrinsic delay for boolean nodes in the logic cells used to implement the circuit, and a fan-out delay based on the R-C delay values for the target library.

The circuit is analyzed by generating a logic expression of the circuit having at least one logic stage with a number of nodes, each node having input signals and an output signal. The nodes of the logic description are then ordered according to their logic stage, and the last node of the logic description is identified. A total delay value for each node of the logic description is determined, including a wire delay value, and a node delay value, and the total delay value of the last node is the total delay of the circuit.

The total delay value of a node is determined by obtaining a boolean logic expression for the node, the logic expression having a number of logic terms each with input signals. Beginning with the first logic term of the node, the input signals of the logic terms are ordered by their respective fan-in delay values. A number of input signal are selected, and a node delay is determined for the logic term based on the fan-in delays of the selected input signals and the intrinsic delay of a selected canonical logic cell. The selected input signals are removed from the set of input signals, and the output signal is added therein as an input signal. The list of input signals is then resorted, and the selection and determination process repeated until there remains only a single input signal in the list. This process is then repeated for each logic term in the node. Once all the logic terms are analyzed, a wire delay is determined for the node. These steps are then repeated for each node of the logic description, resulting in a complete timing analysis of the circuit. The timing delay of the circuit has been minimized because the latest arriving input signals have been assigned to the latest logic stages in the circuit. This minimized timing delay for the circuit can then be compared by the logic synthesis tool with other logically equivalent gate networks of the circuits to select the gate network having the lowest minimized value.

DESCRIPTION OF THE PREFERRED EMBODIMENT

Figure 1:
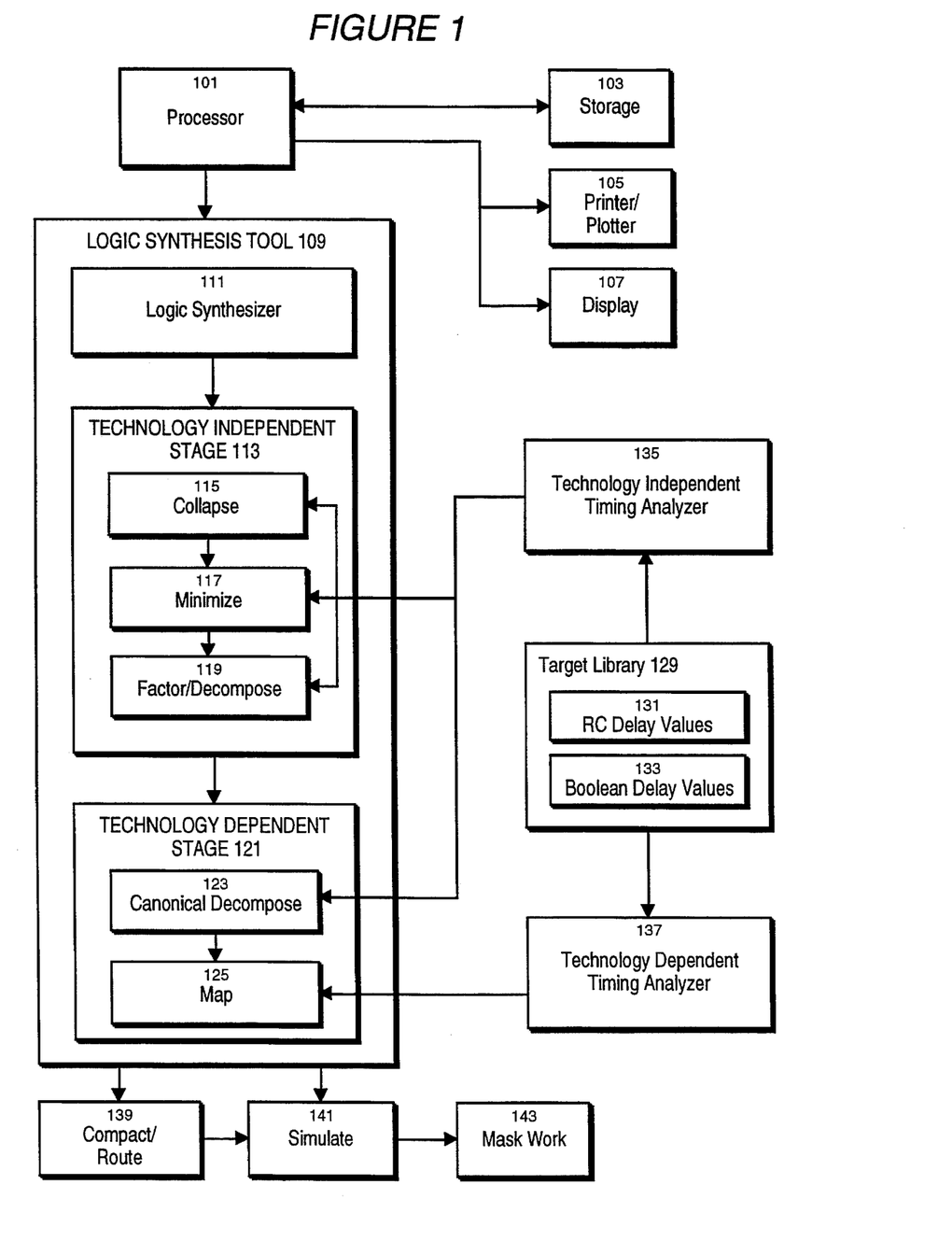
FIG. 1 is a block diagram of electronic design automation (EDA) system 100 that includes a logic synthesis tool 109, a technology independent (TI) timing analyzer 135, a target cell library 129, a compactor/router 139, and a simulator 141 implemented using a processor 101 and a storage 103 containing a prototype circuit design.

FIG. 1 shows a block diagram of an EDA system 100 for the computer-assisted electronic engineering and design of prototype circuits and systems. The EDA system 100 includes software-implemented circuit design tools in a conventional stand-alone or networked engineering workstation having a micro-processor 101 and a digital storage unit 103. The EDA system 100 serves as a platform for electronic circuit prototype definition using a logic synthesis tool 109, and for verification by a logic simulator 141, in conjunction with system or circuit manufacturing using circuit lay-out compaction and routing 139, and mask work creation for circuit fabrication 143.

The logic synthesis tool 109 is provided as a software program in the storage unit 103 for execution by the processor 101. The logic synthesis tool 109 receives a conventional, high-level hardware description file (e.g., Verilog, VHDL, or other similar format) that defines a behavioral model or a register transfer level description of the operations of a prototype circuit or system. A logic synthesizer 111 converts the hardware description file into a gate level netlist using conventional means, and then optimizes the netlist in two stages: technology-independent stage 113 and technology-dependent stage 121, prior to outputting an optimized netlist useful for conventional logic simulation 141 or lay-out compaction and routing 139.

The technology independent stage 113 optimizes the netlist using various modules, including collapse 115, minimize 117 and factor/decompose 119. These modules manipulate the netlist to output an optimized logic description of the prototype circuit to the technology dependent stage 121. The optimized netlist then is decomposed 123 into canonical form and mapped 125 using logic cells from the target library 129.

The target library 129 includes a plurality of logic cells, along with related geometrical and connectivity information for mapping 125 the decomposed 123 logic expression of the prototype circuit into a specific fabrication technology. The target library 129 includes for each logic cell an intrinsic boolean delay value 133. The intrinsic boolean delay values 133 represent the delay incurred in generating an output signal from a logic cell for a set of input signals. Also included in the target library 129 is an average resistance-capacitive (R-C) delay value 131 for fan-outs from logic cells in the target library 129. The R-C delay value 131 is the product of the average resistance and average capacitance values of selected logic cells in the target library 129. The selected logic cells can include all logic cells in the library, or only particular logic cells that will be used for implementing the prototype circuit, thereby increasing the accuracy of the average R-C delay value 131 when it is known which logic cells will be used during mapping 125. The R-C delay value 131 and the intrinsic boolean delay values 133 are determined during compilation of the target library 129, thereby avoiding any runtime delay during the technology independent and dependent optimization stages 113, 121.

In accordance with the present invention, the netlist of the prototype circuit output by the logic synthesizer 111 is optimized by logic synthesis tool 109 at technology-independent stage 113 using a technology independent timing analyzer 135 that employs the delay values 131, 133 during a timing analysis 200 (FIG. 2) of a portion of the prototype circuit. This optimization occurs independently of and prior to performing further technology-dependent optimization 121, wherein the technology independent timing analyzer 135 can also be employed.

Typically during each of the TI logic optimization substages of collapse 115, minimize 117, and factor/decompose 119, for any set of nodes that implement part of the prototype circuit there are various logically equivalent sets of gate networks that can be output from the substage. Each of these alternate gate networks have variant total delay values when mapped 125 with logic cells from the target library 129. The logic synthesis tool 109 invokes the timing analyzer 135 to individually evaluate the total delay value of each of the possible gate networks output by a TI substage. The logic synthesis tool 109 can then select as the optimized output of the substage the gate network having a minimum delay value using the logic cells of the target library 129.

Figure 2:
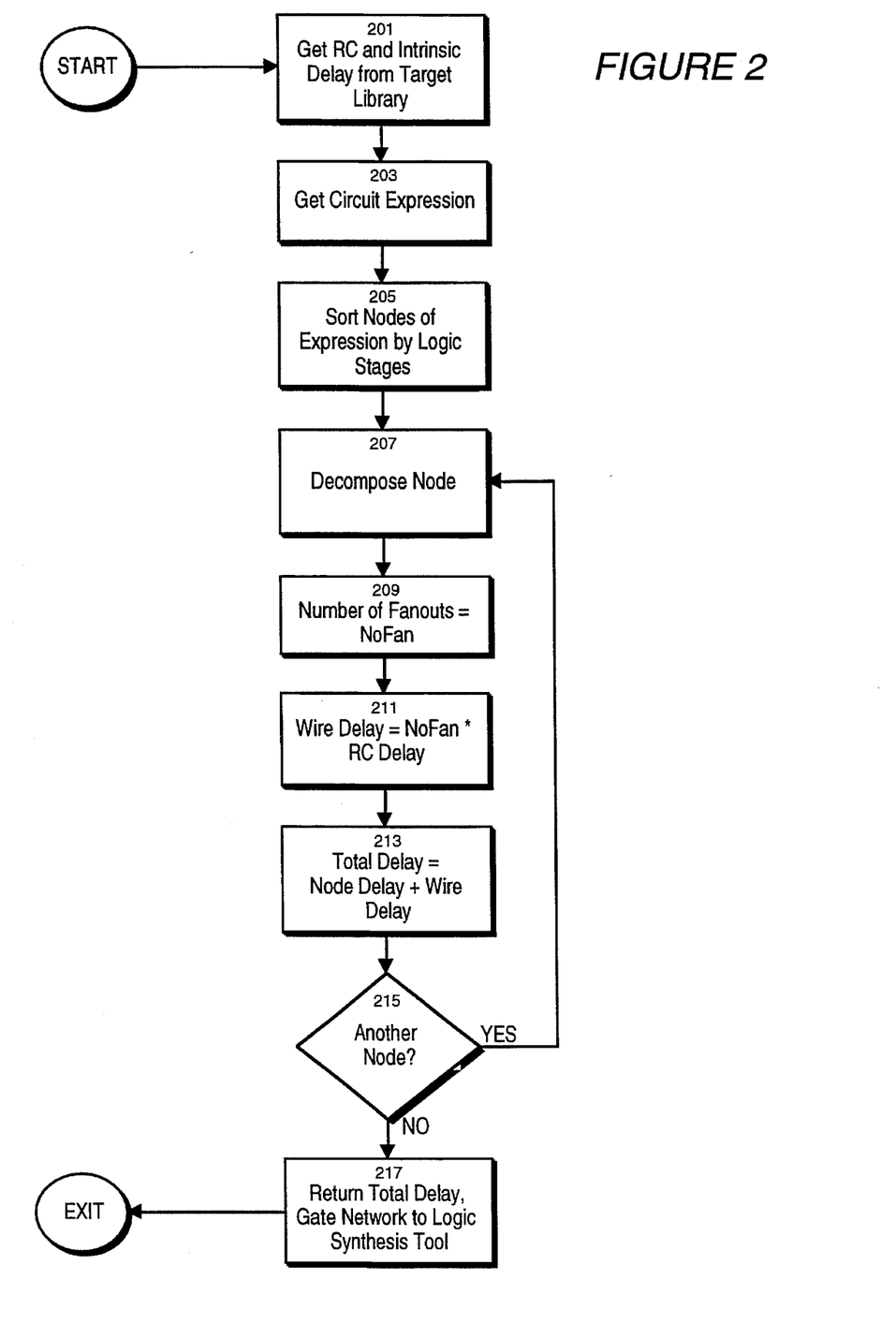
FIG. 2 is a flow chart of the operation of the TI timing analyzer 135 for analyzing the timing delay of the logic expression of a digital circuit using the delay values in target cell library 129.

The timing analysis 200 provided by the timing analyzer 135 in conjunction with any of the modules of the logic synthesis tool 109 is shown in the flowchart of FIG. 2. The timing analyzer 135 first obtains 201 the average R-C delay value 131 and the intrinsic delay value 133 of a selected canonical cell from the target library 129. In the preferred embodiment the intrinsic delay value 133 for a NAND2 logic cell is used.

Figure 4:
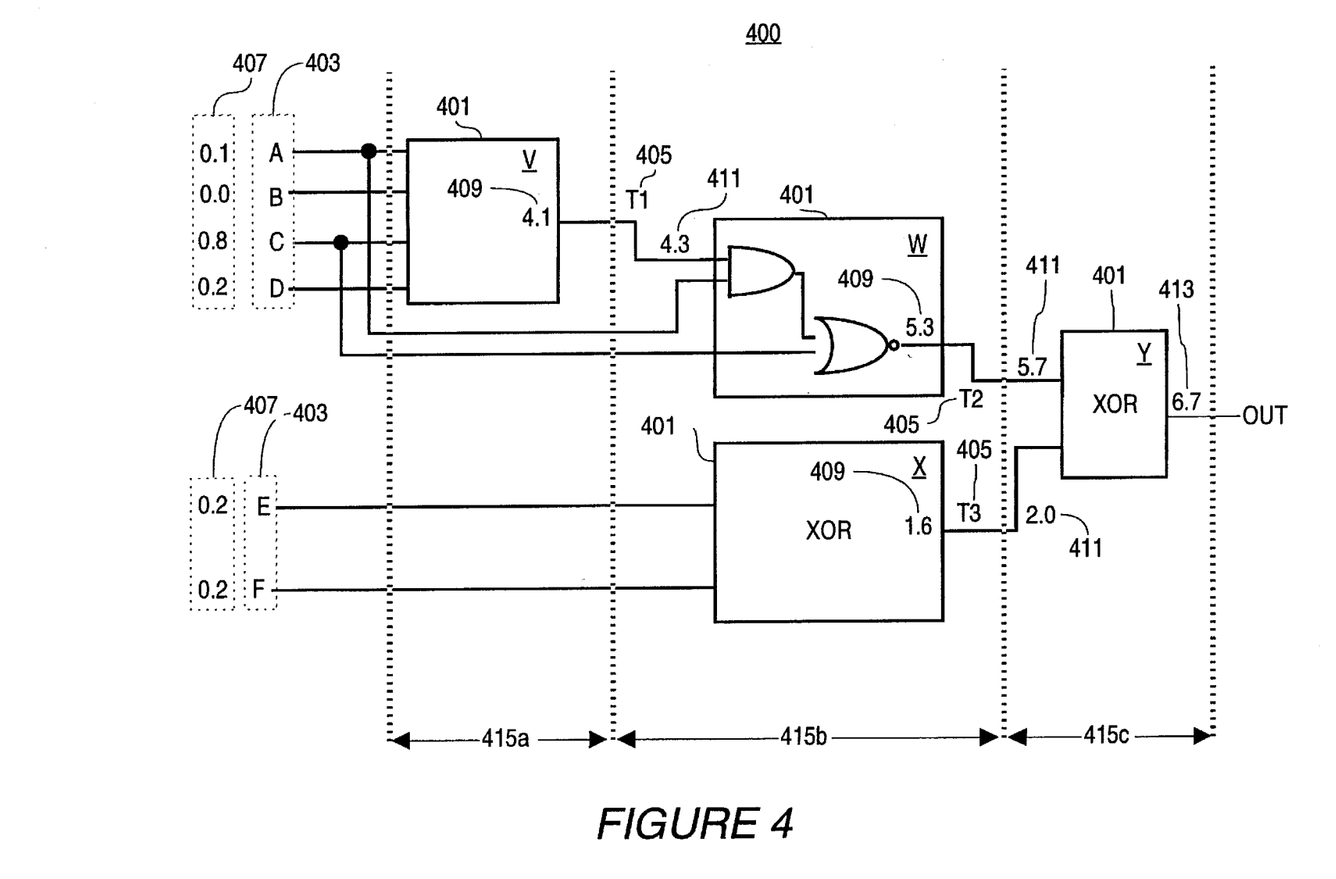
FIG. 4 is an illustration of a gate network including nodes 401, labeled V, W, X, and Y, having input signals 403 labeled A, B, C, D, E, and F, output signals 405 labeled T1, T2, T3, and OUT.

The timing analyzer 135 also obtains 203 from the logic synthesis tool 109 a logic description for a gate network of a portion of the prototype circuit to be analyzed during optimization of the circuit by one of the TI stage 113 modules. FIG. 4 shows an example gate network 400 of a circuit for analysis by the timing analyzer 135. The gate network of FIG. 4 includes four nodes 401, labeled V, X, W, and Y, and a number of input signals 403 to the nodes, labeled A, B, C, D, E, and F. Each input signal 403 has an input delay value 407, which determines the arrival time of the input signal 403 into the node 401. Thus input signal A has a delay value 407 of 0.1 units, using a timing scale appropriate to the fabrication technology for the circuit, typically nanoseconds. A node 401 has a node delay value 409 that is the delay incurred by the node 401 to process all of its input signals 403. Each node has an output signal 405, here labeled T1, T2 and T3, which feeds into another node 401 as an input signal. The output signal 405 also has a delay value that is the total delay value 411 of the node, and includes the node delay value 409 and a wire delay value based on the number of fan-outs for the output signal 405 to other nodes 401 in later logic stages 415.

The logic expression for the gate network 400 of FIG. 4 is:

$$OUT = \overline{T2}T3 + T2\overline{T3} \quad \text{Eq. 1}$$

where T2 is:

$$\overline{(A)(T1)} + C \quad \text{Eq. 2}$$

where T1 is:

$$\overline{A}\overline{B}CD + AB\overline{C}D + ABC\overline{D} + \overline{A}BCD + \overline{ABCD} \quad \text{Eq. 3}$$

and where T3 is:

$$\overline{E}F + E\overline{F} \quad \text{Eq. 4}$$

The nodes 401 of the gate network 400 can be organized into logic stages 415 through which the input signals 403 must be processed. In the gate network 400 of FIG. 4 there are three logic stages, with node V as the only node 401 in the first logic stage 415a, nodes W and X in the second logic stage 415b, and node Y in the final logic stage 415c.

The timing analyzer 135 sorts 205 the nodes 401 of the logic description according to their logic stage 415, thus preserving the processing order of the input signals 403 during the timing analysis 200.

Beginning with a first node 401 in a first logic stage 415 of the gate network 400, the timing analyzer 135 decomposes 207 the node to determine a node delay value 409 for the node to process its input signals 403 and produce an output signal 405. The decomposition process 207 is further described below, with respect to FIG. 3. Here, the results of the decomposition 207 will be provided in order to show the overall operation of the timing analyzer 135. Thus in FIG. 4, prior to decomposition 207 node V is structured as in FIG. 5A, and has a node delay value 409 of 5.3 for output signal T1, when there is an intrinsic delay value 133 of 1.5 for the NAND4, an intrinsic delay value 133 of 2.0 for the NOR5, and an R-C delay value 131 of 0.2. After decomposition 207, the node delay value 409 of node V is 4.1, as shown in FIG. 5B. The derivation of this value is described below with respect to FIG. 3.

The timing analyzer 135 then determines the wire delay of the output signal 405 of the node 401 when the output signal 405 is input into further nodes 401. The wire delay accounts for any fan-out delay from the output signal 405 being input into multiple nodes 401. This is done by determining 209 the number of fan-outs of the output signal of the node 401, and multiplying 211 this number by the average R-C delay value 131 retrieved 201 from the target library 129. The average R-C delay value 131 is representative of the average delay for each fan-out, and thus models the wire delay value from a given output signal 405 to a set of nodes 401. The combined wire delay value and the node delay value 409 result in the total delay value 411 for the node 401.

For example, in FIG. 4 there is only fan-out for the output signal T1, since the output signal T1 is input only into node W. The average R-C delay value 131 of 0.2 was previously retrieved from the target library 129. Thus the wire delay value is equal to 1*0.2, or 0.2. The total delay value 411 of node V is then determined 213 as the sum of the node delay value 409 and the wire delay value. In FIG. 4, the total delay value 411 of node V is 4.3 following decomposition 207.

This process is repeated 215 for each node 401 in each logic stage 415 of the gate network 400, thereby generating a total delay value 411 for each node 401. When all of the nodes 401 of the gate network 400 have been decomposed 207, then the total delay value 413 of the entire gate network 400 will be the total delay value 411 of output signal of the last node 401 in the gate network. This is because the delay value of each of the input signals for the last node 401 in the last logic stage 415 will be the total delay values 411 of each of nodes 401 in the prior logic stage 415. In the example of FIG. 4, the total delay value 413 of the gate network 400 is 6.7, and represents the minimized delay value 413 for the specific gate network (assuming the minimization 117 described below, without collapsing 115 or factoring/decomposing 119) passed to the timing analyzer 135 by the logic synthesis tool 109.

The total delay value 413 of the gate network 400 is returned 217 to the logic synthesis tool 109, which can compare it to the total delay values 413 of other logically equivalent, but structurally different gate networks that have been analyzed by the timing analyzer 135 to determine which gate network provides the minimum timing delay. The gate network with the minimum total delay value 413 will then be chosen by appropriate module of the logic synthesis tool 109 for optimizing the circuit during that module's processing function.

Figure 3:
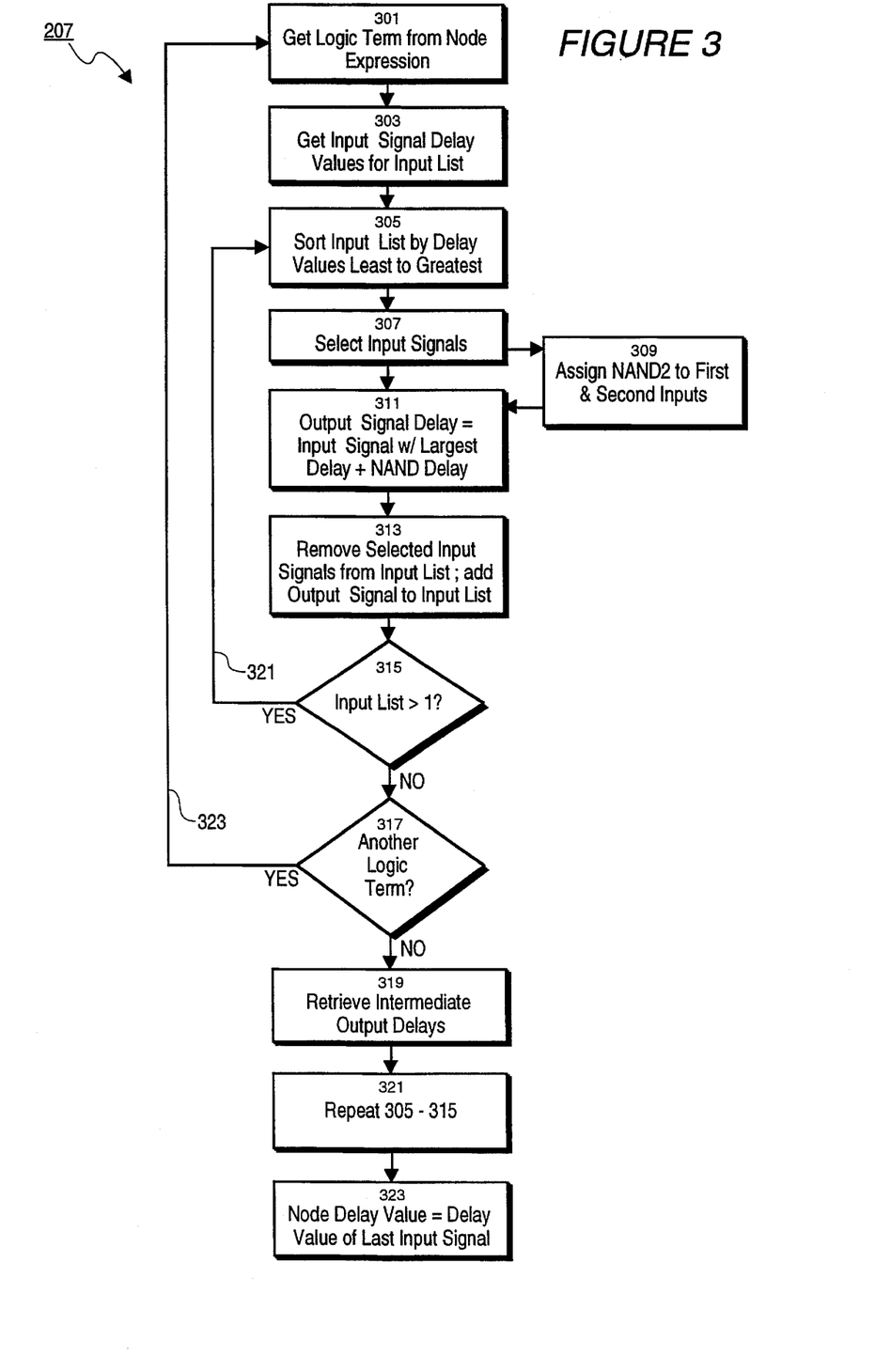
FIG. 3 is a flow chart of the decompose 207 process for decomposing a node of a gate network during the operation of the TI timing analyzer 135.

FIG. 3 shows the decomposition 207 process used during the timing analysis 200. The logic expression of each node is obtained 301 from the logic description of the gate network provided to the timing analyzer 135 by the logic synthesis tool 109. The logic expression is preferably in sum of products form. In the sum of products form, there will be two stages of logic, an AND stage including a number of product logic terms, and an OR stage with a single sum logic term. Each of these logic terms is analyzed as follows.

Starting with a first product logic term of the logic expression of the node 401, the delay values 407 of the input signals 403 of the logic term are obtained 303. These delay values will be determined based on either the fixed delay values for the input signals 403 entering the gate network 400, or previously determined by the timing analyzer 135 in analyzing a node 401 in a prior logic stage 415, as the output signals from one node 400 become the input signals to a next node 400. The input signals 403 of the logic term form an input list.

For example, assume that the total delay value 413 of the gate network 400 is being determined. The timing analyzer 135 thus begins the process with node V in the first logic stage 415, and decomposes 207 that node. The equation for node V is:

$$T1 = \overline{AB}\ \overline{CD} + AB\ \overline{CD} + \overline{ABCD} + \overline{A}BCD + \overline{ABC}\ \overline{D} \quad \text{Eq. 3}$$

Figure 5A:
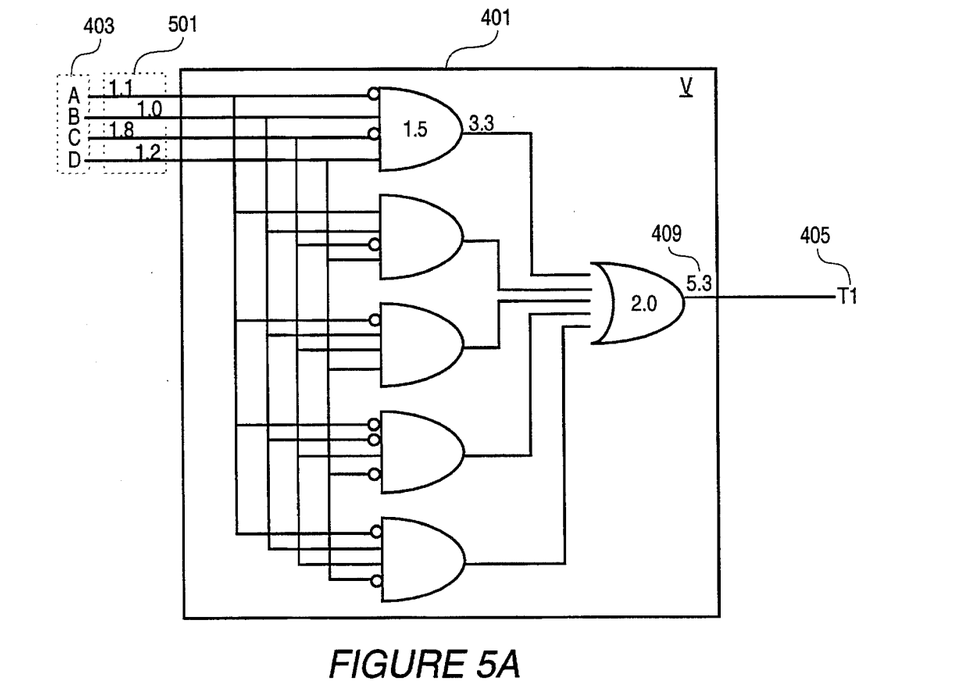
FIG. 5A is an illustration of the sum of products form of node V, prior to analysis by the timing analyzer 135, and decomposition 207.
Figure 5B:
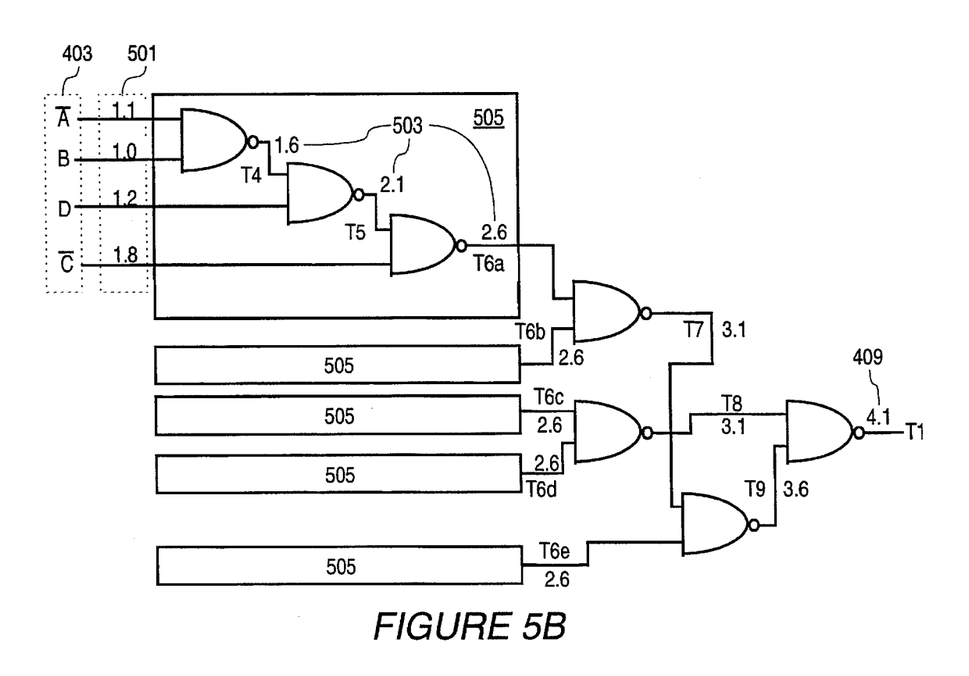
FIG. 5B is an illustration of node V after decomposition 207 by the timing analyzer 135.

The gate network for this equation prior to decomposition 207 is shown in FIG. 5A. The input signal 403 to each subexpression have the same delay values 407, based on the fan-in delays. The delay value after each AND4 in the AND logic stage is 3.3, based on the latest arriving input signal C, with a delay of 1.8, and an intrinsic boolean delay value 133 of 1.5. The OR5 has an intrinsic boolean delay value of 2.0, and as all the input signal to the OR5 have a delay of 3.3, the node delay value 409 is 5.3.

The decomposition 207 of node V is illustrated in FIG. 5B, as follows. The first product term of the logic expression of node V, ($\overline{ABCD}$), is obtained 301 from the equation for the node and storing the input signals ($\overline{A}$, B, $\overline{C}$, D) in the input list. The input list is sorted 305 by the delay value 407 of each input signal 403, which already includes the fan-in delay, if any, of each input signal. The fan-in delay is the average R-C delay 131 from the target library, times the number of terms that include the input signal as a literal. Here input signal $\overline{A}$ is input into five terms, so its fan-in delay is 1.0, assuming a 0.2 R-C delay 131. The input delay value 407 for input signal $\overline{A}$ is then 1.1, since input signal $\overline{A}$ has an initial delay value of 0.1. The input delay 501 for signals B, $\overline{C}$, and D is 1.0, 1.8, and 1.2, respectively, each having a fan-in delay of 1.0. Sorting the input signals 403 by their input delays 407, results in an ordered list of input signals from least to greatest delay value, here (B, $\overline{A}$, D, $\overline{C}$).

A first set of input signals 403 is selected 307 from the input list. The first set of input signals 403 are those signals with the lowest input delay values 407, and thus represent the earliest arriving input signals 403 for the product term. In the preferred embodiment, two input signals are selected, which in this example is input signals (B, $\overline{A}$). Beginning with the first set of input signals 403 in the input list, the timing analyzer 135 determines 311 an output delay value for an intermediate output signal T4 for the input signals.

The output delay value 503 is computed from largest delay value of the selected input signals 403. The output delay value 503 will be the delay value of the last input signal in the selected group plus the intrinsic delay value 133 of a canonical logic cell from the target library 129 for processing the input signals 403.

In the preferred embodiment where two input signals are selected, the intrinsic delay value 133 of a NAND2 cell is used. Using the intrinsic delay value 133 of the NAND2 from the target library 129 closely models the actual timing delay value that would result from mapping the gate network 400 using the target library. It thus allows the logic synthesis tool 109 to select the gate network having the minimized delay given the target library 129. FIG. 5B illustrates the determination of the output delays 503, showing that the intermediate output signal T4 for input signals $\overline{A}$ and B has a delay 503 of 1.6 since the intrinsic delay value 133 of the NAND2 is assumed here to be 0.5, and the largest input delay value 501 is 1.1 from input signal $\overline{A}$. The use of the NAND2 gate in FIG. 5B is for illustration of the operation of the decomposition 207 process only, and does not represent that input signals 403 have been actually mapped to a NAND2 logic cell.

In alternate embodiments, a larger number of input signals, such as three input signals could be selected, and the intrinsic delay value 133 of a NAND3 would be used 311 to determine the output delay value. Also, in other alternate embodiments using NOR logic, the intrinsic delay values 133 of NOR logic cells in the target library 129 with the appropriate input signals could be used 311.

Where the timing analyzer 135 is invoked by the canonical decomposition module 123, an extra step is performed whereby a NAND2 logic cell (or other appropriate logic cell depending on the number of selected input signals 403 for that embodiment) is assigned 309 to the selected input signals 403, and provided in a netlist of the gate network.

Once the output delay value 503 for the first set of input signals 403 has been determined 311, the input signals (B, $\overline{A}$) are removed 313 from the input list and the intermediate output signal T4 is added to the input list, resulting in (D, $\overline{C}$, T4). The intermediate output signal is added to the input list because it now will be an input signal to another logic term in the node, and its delay value 503 determines the input delay for that logic term.

With the intermediate output signal in the input list, a conditional tests 315 whether there is more than one input signal in the input list. If so, then the timing analyzer 135 repeats a loop 321 beginning by sorting 305 the input list by the timing delay values, in order to generate 311 the intermediate output delay value 503 for another set of input signals 403. This will now place the intermediate output signal T4 from the previous logic term in the proper delay order with the remaining original input signals 403. In this example, the ordered input list following the first pass through sequence 305–315 is (D, $\overline{C}$, T4), and thus loop 321 is repeated. When the list is sorted 305 the order becomes (D, T4, $\overline{C}$) since the delay value 503 of T4 is less than the delay value 407 of $\overline{C}$.

Again, a set of input signals is selected 307, here (D, T4), and the output delay 503 for another intermediate output signal T5 is computed 311, as equal to 2.1, since now T4 is the later arriving signal with a delay of 1.6, plus the intrinsic delay value 133 of 0.5. The input signals are again removed 313 from the input list, and the intermediate output signal T5 is added to the input list, as before. In this case, this leaves the input list as ($\overline{C}$, T5).

The loop 321 is repeated as long as there is more than one input left in the input list, and results in a timing analysis of the supplied logic term. Continuing with the example above, the input list now contains two input signals, ($\overline{C}$, T5) so loop 321 is again repeated. The input list is sorted 305, leaving it in is current order, and the input signals selected 307. The output delay 503 for another intermediate output signal T6 is determined 311, here equal to 2.6, using the delay of T5 and the intrinsic delay value 133 of the NAND2. The output signal T6a is placed in the input list, and the input signals ($\overline{C}$, T5) are removed, leaving only signal T6a. Since the input list contains only one term, loop 321 is not repeated, and the output signal T6a of the product logic term is stored as an input signal for a sum logic term in the OR stage.

A second conditional 317 tests whether there are any further logic terms in the logic expression of node V. If so, the next logic term, here (AB$\overline{C}$D), is obtained 301, and the above decomposition analysis repeated in loop 323. In this example, the input signals (A, B, $\overline{C}$, D) are obtained 303, and sorted 305 to provide an input list of (B, A, D, $\overline{C}$). Here the input delays for all of the input signals for this product logic terms are the same as before, and are the same for all the terms. Accordingly, the decomposition of each of the remaining logic terms is the same as the decomposition of the first term, and is illustrated in FIG. 5B by the repetition of the cascaded NAND logic cells 505. Thus each product logic term in Eq. 3 has output delay of 2.6 for an intermediate output signal T6(a–e) that is used as an input to the OR stage.

Continuing with the present example, the input signals to the OR stage are (T6a, T6b, T6c, T6d, T6d, T6e) and for the input list. The list is sorted 305, but since all the delay values are the same, there is no change in order. (T6a, T6b) are used as input signals for determining 311 an output delay value 503 of 3.1 for an intermediate output signal T7. Intermediate output signals T6a and T6b are removed 313 from the input list, and T10 is added to the list. Since the input list contains five input signals, (T6c, T6d, T6e, T7), loop 321 is repeated, and the input list is sorted 305, and again, another output signal T8 is generated with another output delay value of 3.1 for input signal T6c and T6d, which are removed 313 from the input list, and T8 is added. The input list now contains (T6e, T7, T8), and so loop 321 is repeated. Sorting 305 does not change the order of the list, so T6e, and T7 are selected 307 and another intermediate output signal T9 with an output delay of 3.6 is generated, and added 313 to the input list. The input list now contains (T8, T9) so the loop 321 is repeated for the last time, to produce the output signal T1 for the node with a node output delay 409 of 4.1. This delay value more accurately reflects the delay of the node that would follow canonical decomposition 123 and mapping 125 than delay value of 5.3 derived from the unanalyzed node.

As stated above, the timing analyzer 135 can be invoked by any of the T1 stage modules to determine the timing delay value for various alternate gate networks resulting from the modules operation. For example, the timing analyzer 135 can be used by the minimize 117 module to determine the optimal minimized form of node V. A Karnaugh map of Eq. 3 for node V shows two possible simplifications:

|    | AB |    |    |    |
|----|----|----|----|----|
| CD | 00 | 01 | 11 | 10 |
| 00 |    |    |    |    |
| 01 |    | (1 | 1) |    |
| 11 |    | (1)|    |    |
| 10 | (1 | 1) |    |    |

EQ. 5

|    | AB |    |    |    |
|----|----|----|----|----|
| CD | 00 | 01 | 11 | 10 |
| 00 |    |    |    |    |
| 01 |    | (1 | 1) |    |
| 11 |    |    | (1)|    |
| 10 | (1 | 1) |    |    |

EQ. 6

$$T1 = \overline{A}BD + \overline{A}CD + B\overline{C}D \qquad \text{Eq. 5}$$

$$T1 = \overline{A}BC + \overline{A}CD + B\overline{C}D \qquad \text{Eq. 6}$$

Figure 6A:
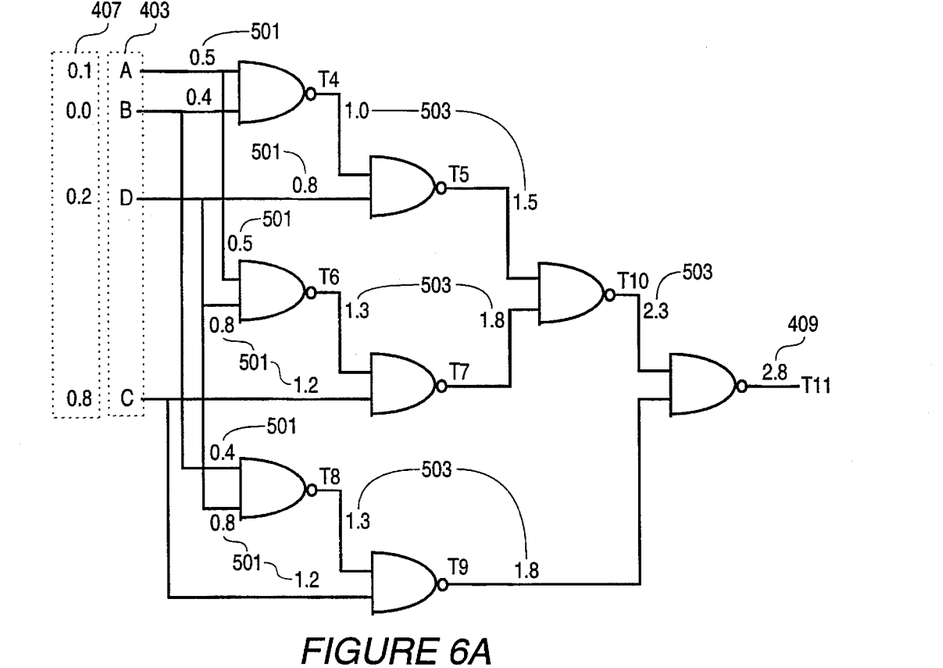
FIGS. 6A and 6B are illustrations of alternate forms of node V following minimization 117 and the results of the timing analysis 200 on each form.
Figure 6B:
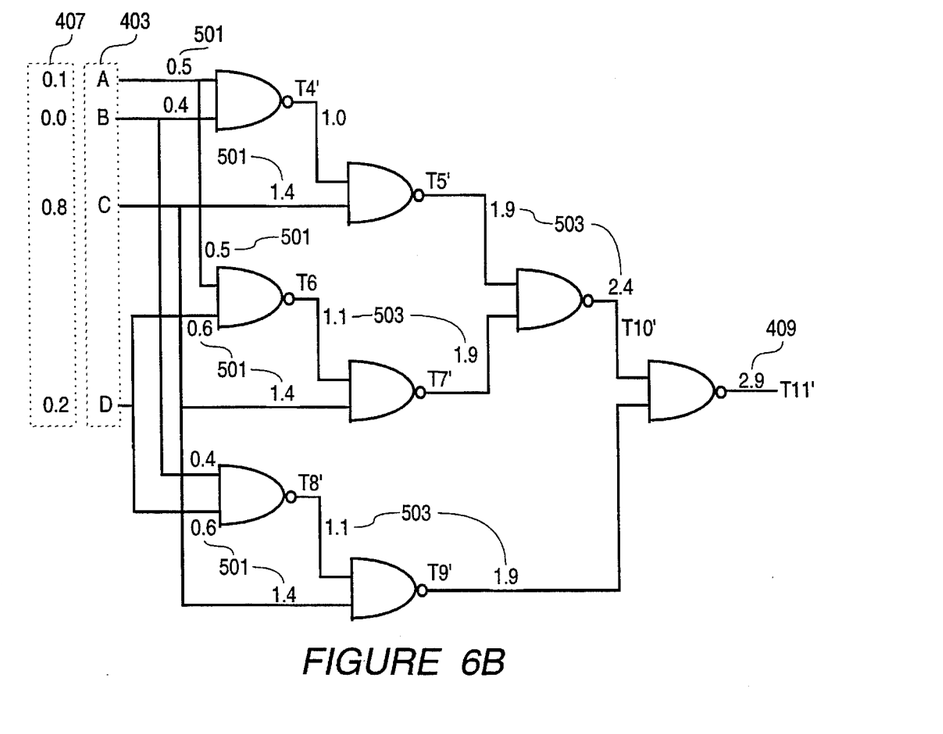

Each equation for the simplified node is sent separately to the timing analyzer 135 to determine which simplified logic expression results in the minimized timing delay, and hence is the optimal implementation for node V using the logic cells of the target library 129. The results of the timing analysis 200 on each logic expression are shown in FIGS. 6A and 6B. Shown in each figure are input signals A, B, C, and D, and their various delay values 501, 503 occurring for each input and output signal in each logic stage. The equations used here are for simple illustration of the timing analysis method, and those of ordinary skill in the art will recognize that the method can be applied to equations having numerous terms and literals.

Accordingly, when the timing analyzer 135 receives the logic expression for node V, it performs the decomposition 207 described above, ordering the input signals, determining the delay for each intermediate output signal of a NAND2, and so, to produce a node output delay value for each of the alternate simplified nodes of Eqs. 5 and 6.

When the timing analysis 200 is performed on Eq. 5, the output signal T11 for the node has output delay value of 2.8, which is the node delay value 409 for the simplified node. When the timing analysis 200 is performed on node V using Eq. 6 the node delay value is 2.9 at output signal T11', as shown in FIG. 6B. This delay value is greater than the previous delay value at T11 because of the additional fan-in delay of input signal C, which is a literal in all three product terms of Eq. 6, where it was only in two product terms of Eq. 4. The logic synthesis tool 109, would thus select Eq. 5 as the optimized simplified form for node V.

An example of the timing analysis 200 of the timing analyzer 135 has been shown with the minimize 117 module of logic synthesis tool 109. As stated above, the timing analysis 200 can also be used with the other modules. As a further example, the circuit of FIG. 4 could be collapsed 115 in a variety of different ways, with nodes V and W being collapsed to W', or nodes W and Y being collapsed in Y', or nodes X and Y being collapsed into Y'. The logic synthesis tool 109 would send a logic expression for each collapsed version to the timing analyzer 135, which would determine the total node value 409 for each version.

Figure 7A:
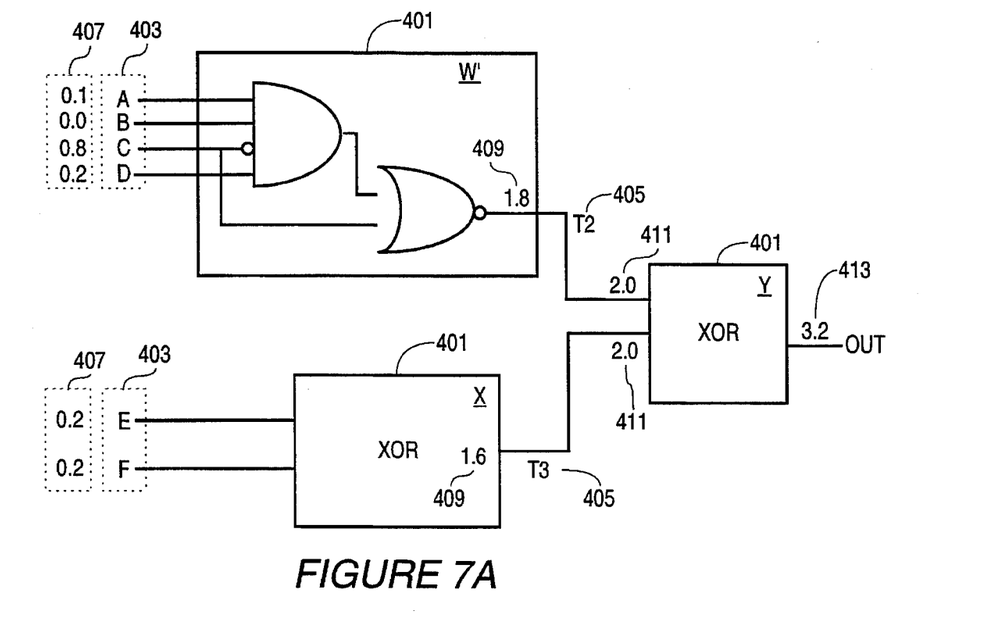
FIGS. 7A and 7B are illustrations of alternate forms of the gate network in FIG. 4 following a collapse operation 115.

FIG. 7A shows the results of the first option, where:

$$T2 = \overline{A(T1) + C} \qquad \text{Eq. 7}$$

$$T2 = \overline{A(\overline{ABCD} + \overline{ABCD} + \overline{ABCD} + \overline{ABCD} + \overline{ABCD}) + C} \qquad \text{Eq. 8}$$

$$T2 = \overline{ABD + C} \qquad \text{Eq. 9}$$

Figure 7B:
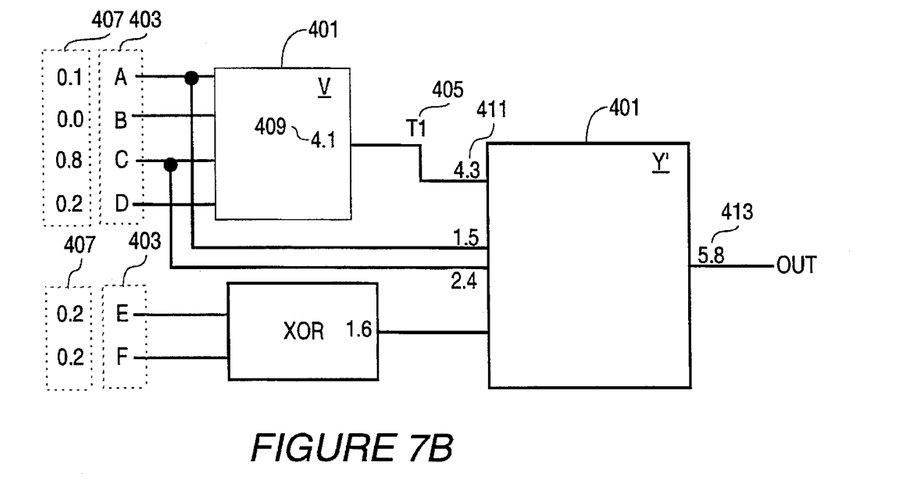

Using the timing analysis 200, the timing analyzer 135 determines that T2' equals 1.8 for W' structured according to Eq. 9. This would reduce the total delay value 413' for the gate network of FIG. 4A to 3.2 from its original value of 6.7. In comparison, collapsing W and Y into Y', as illustrated in FIG. 7B, results in the following expression:

$$OUT = \overline{T2}T3 + T2\overline{T3} \qquad \text{Eq. 10}$$

from Eq 7. above, $$T2 = \overline{A(T1) + C},$$

$$OUT = (\overline{AT1 + C})T3 + (AT1 + C)\overline{T3} \qquad \text{Eq. 11}$$

$$OUT = AT1T3 + CT3 + \overline{A}\ \overline{C}\ \overline{T3} + \overline{T1}\ \overline{C}\ \overline{T3} \qquad \text{Eq. 12}$$

This last equation results in a total delay value 413" for the gate network equal to 5.8, which is greater than the other collapsed version. The logic synthesis tool 109 would thus select the first collapsed version of W and V into W'.

The timing analysis 200 of the timing analyzer 135 can also be used during the technology dependent optimization stage 121. During the TD optimization stage 121, a canonical decomposition module 123 decomposes a boolean expression for the gate network output from the TI stage 113 into canonical form using only canonical logic cells, such as NAND2 and Invertor. When performing the timing analysis 200 for the canonical decomposition module 123, the timing analyzer 135 employs an additional step to assign 309 the input signals 403 to a NAND2 logic cell from the target library 129, create a NAND2 logic cell, and place it into the decomposed circuit. The decomposed gate network is then mapped 125 with the logic cells from the target library 129 by the map module 125, which conventionally selects an arrangement of logic cells for implementing the prototype circuit.

The spirit and scope of the invention is not intended to be limited to the description of the preferred embodiment herein, but is capable of use in other environments or combinations, and is capable of modification or changes within the details of the inventive concept described above. Such modifications include altering or varying the number of input signals selected 307, altering or varying the intrinsic delay 133 used to determine 311 the output signal delay, or changing the way the R-C delay value 131 is determined from the target library. Other modifications are possible, but so long as the timing analysis uses delay values from the target library to determine the timing delay of a circuit during the TI stage of logic synthesis, such modifications are within the inventive concept described herein.

I claim:

1. In a computer automated design system for designing digital logic circuits, a computer-implemented method for analyzing a total delay value for a digital circuit during logic synthesis, comprising the steps of:

generating a logic description of the digital logic circuit having at least one logic stage including plurality of nodes, each node having at least one input signal and an output signal;

compiling a target library of logic cells, each logic cell having at least one delay value, including an intrinsic delay value; and, determining the total delay value of the logic description including the steps of:

ordering the nodes of the logic description according to their logic stages;

identifying a last node in the logic description; and determining a total delay value of each node of the logic description, the total delay value including the wire delay value of the output signal of the node and a node delay value, wherein the total delay value of the logic description is the total delay value of a last node of the logic description, including the steps of:

a) extracting a logic expression for a node, each logic expression including at least one logic term, each logic term having at least one input signal and an output signal, each input signal having a delay value;

b) ordering the input signals of a logic term by their delay values, from a smallest delay value to a greatest delay value, to define an ordered list of input signals;

c) determining a delay value for an intermediate output signal for selected input signals of the logic term as a function of the input delay values of the input signals and a delay value of a selected canonical logic cell;

d) removing the selected input signals from the ordered list of input signals and including the intermediate output signal in the ordered list as an input signal;

e) repeating steps b) through d) until the ordered list contains only one input signal;

f) repeating steps b) through e) for each logic term of the logic expression, and for the logic expression itself, such that output signal of the node is the input signal in the ordered list, and the total delay value of the node is the delay value of the output signal;

g) determining a wire delay value for the output signal of the node, the total delay value of the node including the wire delay value of the output signal of the node; and h) repeating steps a) through g) for each node of the logic description.

2. The method of claim 1, wherein each logic cell in the target library includes a resistance value and a capacitance value, the method further comprising the step of: obtaining an average resistance-capacitance delay value for selected logic cells of the target library from the resistance and capacitance values of the selected logic cells.

3. The method of claim 1, wherein the step of determining a delay value for an intermediate output signal comprises the step of:

combining a largest delay value of the selected input signals of the logic term with the intrinsic delay of a selected canonical logic cell.

4. The method of claim 1, wherein the step of determining a wire delay value for the output signal of the node comprises the steps of:

determining a number of fan-outs for the output signal of the node; and, multiplying the number of fan-outs by an average resistance-capacitance delay value for selected logic cells of the target library.

5. The method of claim 1, further comprising the step of:

minimizing the total delay value of each node of said logic description including the steps of:

extracting a new logic expression for each node, equivalent to said logic expression extracted for each of said nodes in step (a), each logic expression including at least one logic term, each logic term having at least one input signal and an output signal, each input signal having a delay value;

repeating steps (b)–(g) for each node of the logic description; and selecting said lowest total delay value as determined in step (g).

6. A computer program embodied in a tangible medium and capable of being read by a computer, for performing the method of claim 1.

7. In a computer automated design system for designing digital logic circuits, a computer-implemented method for analyzing a total delay value for a digital circuit during logic synthesis, comprising the steps of:

generating a logic description of the digital logic circuit having at least one logic stage including plurality of nodes, each node having at least one input signal and an output signal;

compiling a target library of logic cells, each logic cell having at least one delay value, including an intrinsic delay value; and, determining the total delay value of the logic description including the steps of:

a) ordering the nodes of the logic description according to their logic stages;

b) extracting a logic expression for a node, each logic expression including at least one logic term, each logic term having at least one input signal and an output signal, each input signal having a delay value;

c) ordering the input signals of a logic term by their delay values, from a smallest delay value to a greatest delay value, to define an ordered list of input signals;

d) determining a delay value for an intermediate output signal for selected input signals of the logic term as a function of the fan-in delay values of the input signals and a delay value of a selected canonical logic cell;

e) removing the selected input signals from the ordered list of input signals and including the intermediate output signal in the ordered list as an input signal;

f) repeating steps c) through e) until the ordered list contains only one input signal;

g) repeating steps c) through f) for each logic term of the logic expression, and for the logic expression itself, such that output signal of the node is the input signal in the ordered list, and the total delay value of the node is the delay value of the output signal;

h) determining a wire delay value for the output signal of the node, the total delay value of the node including the wire delay value of the output signal of the node; and i) repeating steps b) through h) for each node of the logic description, such that the total delay value of the logic description is the total delay value of a last node of the logic description.

8. The method of claim 7, wherein the step of determining a delay value for an intermediate output signal comprises the step of:

combining a largest delay value of the selected input signals of the logic term with the intrinsic delay of a selected canonical logic cell.

9. The method of claim 7, wherein the step of determining a wire delay value for the output signal of the node comprises the steps of:

determining a number of fan-outs for the output signal of the node; and multiplying the number of fan-outs by an average resistance-capacitance delay value for selected logic cells of the target library.

10. The method of claim 7, further comprising the step of:

minimizing the total delay value of each node of said logic description including the steps of:

extracting a new logic expression for each node, equivalent to said logic expression extracted for each of said nodes in step (a), each logic expression including at least one logic term, each logic term having at least one input signal and an output signal, each input signal having a delay value;

repeating steps (b)–(h) for each node of the logic description; and selecting said lowest total delay value as determined in step (h).

* * * * *